United States Patent [19]

Chang

[11] Patent Number: 4,799,945
[45] Date of Patent: Jan. 24, 1989

[54] DUAL FREEZING CHAMBER SYSTEM AND METHOD FOR WATER PURIFICATION

[75] Inventor: Chung N. Chang, Los Altos, Calif.

[73] Assignee: Polar Spring Corporation, Menlo Park, Calif.

[21] Appl. No.: 114,232

[22] Filed: Oct. 27, 1987

[51] Int. Cl.⁴ .......................... B01D 9/04; C02F 1/22
[52] U.S. Cl. ....................................... 62/532; 62/124
[58] Field of Search ........................ 62/123, 532, 124

[56] References Cited

U.S. PATENT DOCUMENTS

| | | | |
|---|---|---|---|
| 277,931 | 5/1883 | Reynolds | 210/774 |
| 2,340,721 | 2/1944 | Whitney | 62/124 |
| 2,997,856 | 8/1961 | Pike | 62/58 |
| 3,003,007 | 10/1961 | Newsome, Jr. | 62/532 |
| 3,212,272 | 10/1965 | Sommers, Jr. | 62/532 |
| 3,338,065 | 8/1967 | Ashley | 62/123 |
| 3,344,616 | 10/1967 | Owen | 62/532 |
| 3,367,123 | 2/1968 | Schambra | 62/58 |
| 3,404,536 | 10/1968 | Aronson | 62/535 |
| 3,630,042 | 12/1971 | Petsinger | 62/58 |
| 3,675,436 | 7/1972 | Ganiaris | 62/58 |
| 3,712,075 | 1/1973 | Smith et al. | 62/123 |
| 3,779,030 | 12/1973 | Best | 62/58 |
| 4,236,382 | 12/1980 | Cheng et al. | 62/537 |
| 4,356,015 | 10/1982 | Oliver | 62/543 |
| 4,448,032 | 5/1984 | Hibino et al. | 62/124 |
| 4,457,769 | 7/1984 | Engdahl | 62/532 |
| 4,572,785 | 2/1986 | Braaten | 210/181 |

OTHER PUBLICATIONS

Freeze Crystallization James A. Heist, *Chemical Engineering;* May 7, 1979; pp. 348–358.

Primary Examiner—Ronald C. Capossela
Attorney, Agent, or Firm—A. C. Smith

[57] ABSTRACT

A water purification method and system, employing at least a first chamber and a second chamber to freeze a portion of a volume of impure water in the first chamber while melting ice in the second chamber. The unfrozen liquid, which has a high impurity concentration, is drained from the first chamber. The melted ice, from which up to 95% of the original impurities have been rejected during the freezing operation, is drained from the second chamber. Then, a new volume of impure water is supplied to the second chamber, and the process continues with the roles of the chambers reversed. The system includes at least one heat transfer fluid coil portion wrapped around (or disposed within) each chamber. The system requires no scraping or transporting of frozen ice, requires no chemical or cartridge replacement, and can be embodied in a small housing suitable for use as a home or restaurant appliance. The chamber dimensions and the duration of each freezing operation are optimized to maximize the rejection of impurities, given the freezing chamber temperature attainable by the heat transfer fluid coil and the desired system throughput rate.

37 Claims, 6 Drawing Sheets

DUAL FREEZING CHAMBER SYSTEM AND METHOD FOR WATER PURIFICATION

FIELD OF THE INVENTION

The invention relates to water purification methods and systems for partially freezing water, then draining the unfrozen liquid portion, and finally melting the frozen portion. More particularly, the invention relates to water purification methods and systems that employ a multi-stage operating cycle including an earlier stage in which water is frozen in a first chamber and ice is melted in a second chamber, and a later stage is which ice is melted in the first chamber and water is frozen in the second chamber.

BACKGROUND OF THE INVENTION

The most widely used water purification method is distillation, which is accomplished by adding heat to a solution to generate pure water vapor. The water vapor is then usually condensed to produce pure liquid water. The amount of heat required to evaporate the water is about 1000 BTU per pound. To condense the vapor, an additional 1000 BTU per pound must be removed from the vapor. Ideally, one can cascade the evaporation and condensation processes to reduce energy input requirements to the 1000 BTU per pound required for the initial evaporation. In reality, much more energy is required than in the ideal case. State of the art cascading distillation systems require at least 50 BTU per pound of product. Systems with such capability are large, complex, and expensive.

Another purification technique, freezing purification, relies on the phenomenon that when a water solution freezes, it will reject the impurities (both solids and gases) contained therein. Thus, the frozen portion of a partially frozen water solution will have far lower impurity concentration than will the unfrozen liquid portion.

It has been suggested that freezing techniques be employed to purify large quantities of saline water, for example, to satisfy municipal demand. For example, U.S. Pat. No. 3,404,536, issued Oct. 8, 1968 to Aronson, discloses a dual chamber, flash freezing purification system. The Aronson system, designed to process up to approximately 250,000 gallons of saline water per day, is very complex. Aronson sprays 37 degree Fahrenheit saline water from spray nozzles in a first low pressure chamber, so that water will flash freeze on screens located adjacent the spray nozzles. The chamber is kept at low pressure during the freezing process by 24 degree Fahrenheit refrigerant flowing in coils that run through the first chamber. At a later time, the ice-covered screens are washed, and saline liquid is drained away. Still later, 39 degree Fahrenheit refrigerant is caused to flow through the coils in the first chamber, so as to evaporate liquid in a reservoir in the first chamber, which in turn causes the ice on the screens to melt. To complete the cycle, the melted ice is drained away.

While 24 degree Fahrenheit fluid flows through the coils in the first chamber, 39 degree Fahrenheit fluid is caused to flow through the coils of an identical second chamber (also having spray nozzles from which saline water is sprayed onto screens), to melt ice on the screens in the second chamber. When the freezing operation is concluded in the first chamber, and valves are switched to cause 39 degree fluid to flow through the first chamber, valves are simultaneously switched to cause 24 degree refrigerant to flow through the coils of the second chamber. Thus freezing and melting operations are performed in the first and second chambers 180 degrees out of phase with respect to each other.

The Aronson system requires a very complex heat pump subsystem, including valves for controlling the flow of refrigerant to both chambers. The heat pump periodically reverses the flow of refrigerant to the chambers, so that 39 degree refrigerant flows into the heat pump to one of the chambers in one tube, and 24 degree refrigerant later flows out of the heat pump to the same chamber and in the same tube.

In another embodiment, Aronson uses an absorption/desorption refrigerant (such as lithium bromide) together with alternating streams of 85 degree Fahrenheit water and 95 degree Fahrenheit steam in the coils of the refrigeration subsystem. In all embodments, a large apparatus including a complicated system of valves and a complex heat pump are required. Due to the high heat transfer requirements for processing large volumes of saline water using flash freezing, Aronson system'srefrigeration components must accordingly have complex design. Where lithium bromide is used, a refrigerant leak in the Aronson system risks contamination of the water being processed.

Another conventional freezing purification technique is disclosed in U.S. Pat. No. 3,212,272, issued Oct. 19, 1965 to Sommers, Jr. The Sommers system employs stacks of thermoelectric heat pumps positioned between adjacent compartments. Saline water fills alternating ones of the compartments. The pumps are electrically connected to a DC power source so that their "cold" junctions (the heat absorbing junctions) face the liquid saline water. The pumps are selectively activated (the lowermost pump first and the uppermost pump last) so as to freeze the liquid water in the compartments from the bottom up. The "hot" junctions of the pumps face ice contained the other alternating ones of the compartments, so as to melt the ice from the bottom up as the pumps are selectively activated. The melted ice drains to a fresh water storage area. Then, the electrical connections of the pumps are reversed and the empty compartments (which contained ice that has melted away) are filled with saline water. The pumps are again selectively activated from the bottom up, so as to freeze and melt alternate ones of the compartments.

The compartments of the Sommers system are inclined to permit liquid to drain off the inclined top surface of the ice contained therein. This configuration will result in a nonuniform rate of ice formation, due to inherent nonuniformities in salt concentration and specific gravity of the fluid in the compartments, unless this tendency is counteracted by supplemental control means. An additional disadvantage of the Sommers system is that the thermoelectric pumps used are energy inefficient, and accordingly uneconomical to operate. For example, the thermoelectric heat pump Model CP 5-31-06L (manufactured by Melcor) has a coefficient of performance equal to 0.56. Thus the Melcor pump will draw 225 watts from its power supply to remove 125 watts of heat from saline water. Furthermore, the Sommers system (like the Aronson system) is physically large and bulky, thus being unsuitable for use as a home appliance for purifying small to moderate amounts (i.e., a few tens of gallons per day or less) of water.

Continuous freezing purification processes (in contrast to batch processes such as those of Aronson and Sommers) have also been employed for desalinization of a municipal water supply (for example with plant processing capability of one million gallons per day). Such processes have succeeded in desalinizing large volumes of water, but because they require complicated equipment with numerous moving components, have prohibitively high capital cost even for large-scale implementation.

It has not been known until the present invention how to freeze purify water using a simple, safe, economical, and reliable multiple chamber batch system, suitable for use as home or restaurant appliance. The inventive system has few or no moving parts, requires no scraping or transporting of the generated ice, requires no chemical or cartridge replacement, and can be embodied in a small housing suitable for use as a home or restaurant appliance to eliminate as much as 95 percent of the impurities in up to five gallons of water per day with electric energy consumption of about 16.7 BTU per pound of water processed (40 watt-hours per gallon processed).

SUMMARY OF THE INVENTION

The inventive system includes two or more chambers, each alternately employed for a freezing and a melting operation. In one embodiment, two vapor compression refrigeration coils are provided for each pair of chambers. The evaporator portion of one coil is associated with (immersed in or coiled around) a first chamber while the condensor portion is associated with a second chamber. The condensor portion of the other coil is associated with the first chamber, and the evaporator portion of this other coil is associated with the second chamber.

The system operates with a three stage cycle. In one stage, one coil is operated to partially freeze water in a first chamber while simultaneously melting ice in a second chamber. The melted ice is also drained from the second chamber. During the next stage, the unfrozen liquid (containing a high concentration of impurities) is drained from the first chamber and water (containing a low concentration of impurities) is supplied to the second chamber. During the final stage, the other coil is operated to partially freeze the water in the second chamber while simultaneously melting ice in the first chamber. The cycle then repeats.

Alternatively, a single heat transfer coil system is provided for each pair of chambers, with one coil end associated with each chamber. A series of valves are switched between the first and third stages of the cycle to redirect heat transfer fluid flow in the coil so that each coil end alternately removes heat from, and supplies heat to, the associated chamber. The heat transfer coil system may include a vapor compression refrigeration coil, where each coil end alternately functions as an evaporator and as to condensor.

Preferably, the surface area to volume ratio of each chamber, and the frequency of the freezing-melting cycle, are optimized in order to minimize the amount of unfrozen liquid clinging to the ice (due to viscosity) during the draining stage, and to minimize the thickness of the frozen ice layer in the direction of heat transfer (since the thermal insulating property of ice hinders heat flow during the freezing and melting stages), while minimizing overall system dimensions and maximizing the product throughput rate.

DETAILED DESCRIPTION OF THE PREFERRED EMBODIMENTS

The inventive technique will first be discussed generally with reference to the schematic diagram of FIG. 1. Identical chambers 1 and 2 may be alternately filled with impure water from lines 3 and 4, respectively. Vapor compression coils 9 and 10 extend into chambers 1 and 2. The condensor portion 9a of coil 9 is coiled within chamber 2, the evaporator end 9b of coil 9 is coiled within chamber 1, the evaporator portion of coil 10 is coiled within chamber 2, and the condensor portion of coil 10 is coiled within chamber 1. During a first stage of the process, chamber 1 has been supplied with impure liquid water by line 3, and chamber 2 contains ice from which impure liquid has been drained via line 8. Vapor compression coil 9 is activated to freeze a portion of the contents of chamber 1. At the same time, vapor compression coil 9 melts the ice in chamber 2. The melted ice in chamber 2 (from which most of the impurities have been rejected during the freezing process) drains out through product line 6.

During a second stage of the process, the unfrozen liquid in chamber 1 (which has a high concentration of impurities) is drained via line 7 while emptied chamber 2 is filled with impure liquid water via line 4. During a third and final stage of the process, coil 10 is activated to freeze a portion of the contents of chamber 2, while melting the ice in chamber 1. Also during this third stage, the melted ice in chamber 1 is drained via line 5.

The system's total energy loss (exclusive of the energy required to activate the system's valves and to pump refrigerant and other system fluids) is due to the discarding of low-temperature, impurity ladened water. This loss will preferably be reduced by heat exchanging this impurity ladened fluid with the incoming feedwater before the impurity ladened fluid is discarded. The total energy consumption of an embodiment of the inventive system having five gallons per day production rate is very small, estimated to be about 200 watts-hour per day for production of five purified gallons per day with a 50% discard rate, even without heat exchanging the drained off fluid before it is discarded.

Figure 1:
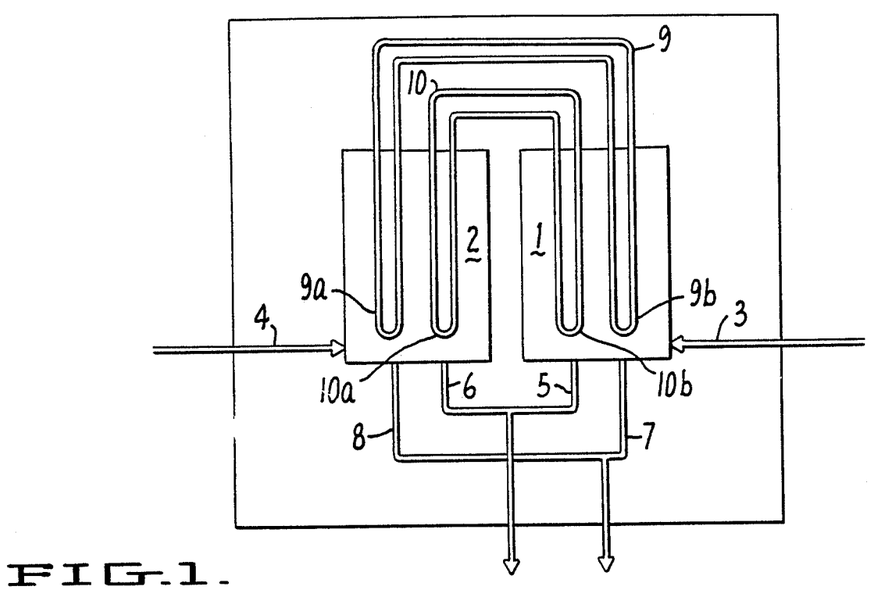
FIG. 1 is a partially schematic simplified cross-sectional view of one embodiment of the inventive system, showing the flow paths of impure and purified water during the process cycle.
Figure 2:
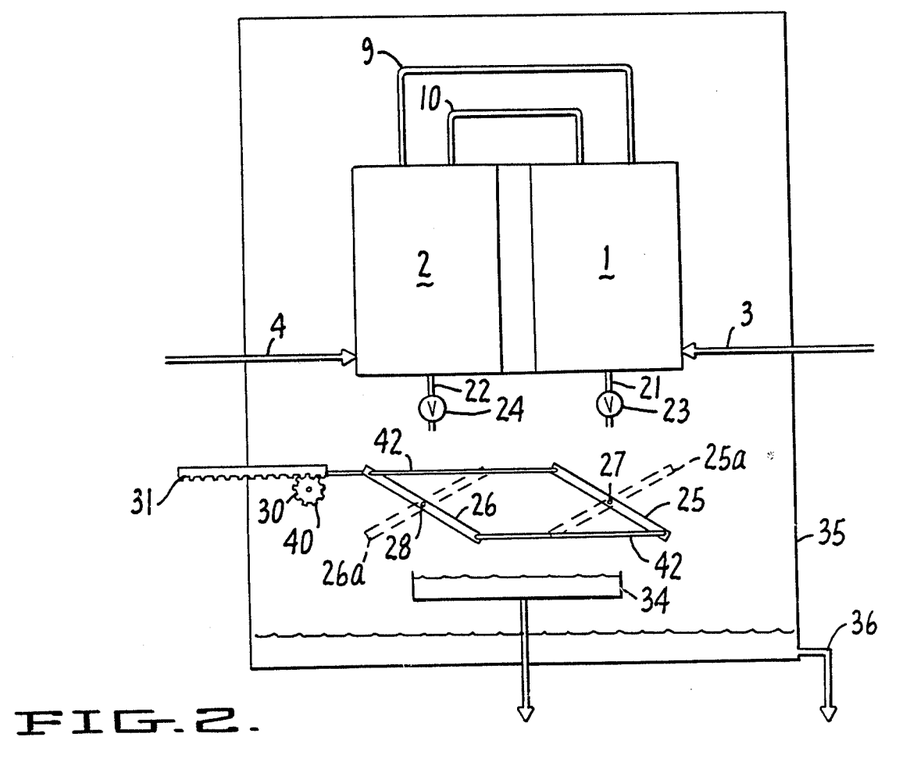
FIG. 2 is a simplified side elevational view of the FIG. 1 embodiment of the inventive system.

FIG. 2 is a simplified diagram of a variation on the FIG. 1 system, showing a trough assembly for separating the purified product of the system from the wastewater to be discarded. Chambers 1 and 2, refrigeration coils 9 and 10, and feedwater inlet lines 3 and 4 are identical to their FIG. 1 counterparts. Outlet lines 21 and 22 are controlled respectively by solenoid valves 23 and 24. During one stage of the production cycle, valve 23 is opened to permit wastewater (i.e., the unfrozen portion of the liquid-ice mixture in chamber 1) to drain onto trough 25, and down trough 25 into wastewater tank 35, from which tank it may be discarded via outlet 36. During the same cycle stage, valve 24 is opened to permit purified melted ice to drain onto trough 26, and down trough 26 into product tank 34.

Following this cycle stage, troughs 25 and 26 are rotated about their pivots, 27 and 28 respectively, by gears 30 and 31. As gear 30 is rotated about its axis 40 by a motor (not shown), its teeth will engage with the meshing teeth of gear 31, causing gear 31 to translate along its longitudinal axis. Gear 31 will thus supply torque sufficient to rotate trough 26, and will urge members 42, connecting troughs 25 and 26, to rotate trough 25 with the same angular displacement as trough 26. The new, rotated positions of troughs 25 and 26 are indicated by dashed elements 25a and 26a, respectively.

After the troughs have been rotated, during a next stage of the production cycle, valve 23 is opened to permit melted ice from chamber 1 to drain onto trough 25, and down trough 25 into product tank 34. At the same time, valve 24 is opened to permit wastewater from chamber 2 to drain onto trough 26, and down trough 26 into wastewater tank 35.

Figure 3A:
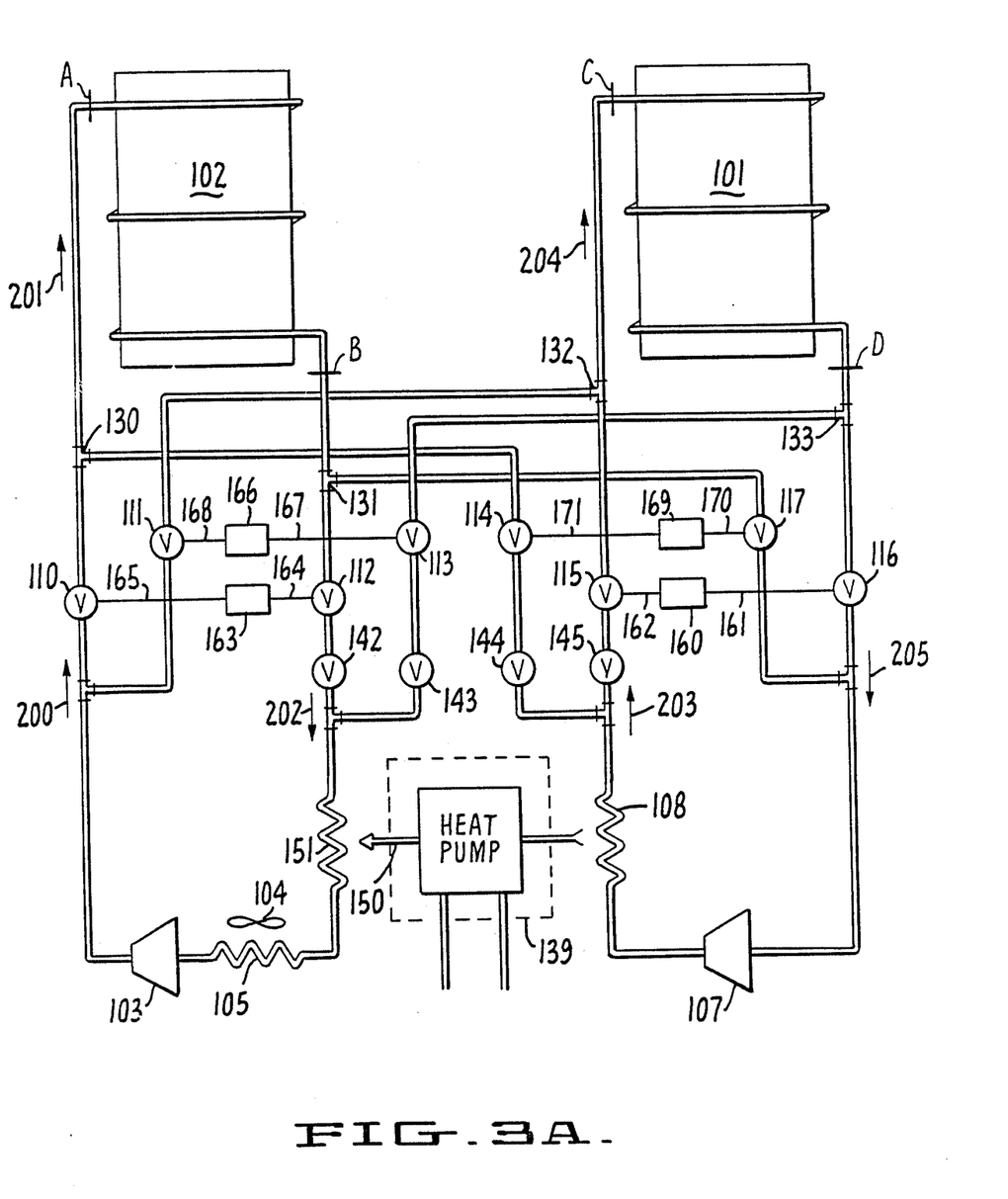
FIGS. 3A and 3B are simplified side elevational views of a first preferred embodiment of the inventive system, including a vapor compression refrigeration coil system. Each of FIGS. 3A and 3B shows the flow of refrigerant during a different stage of the system's operating cycle.
Figure 3B:
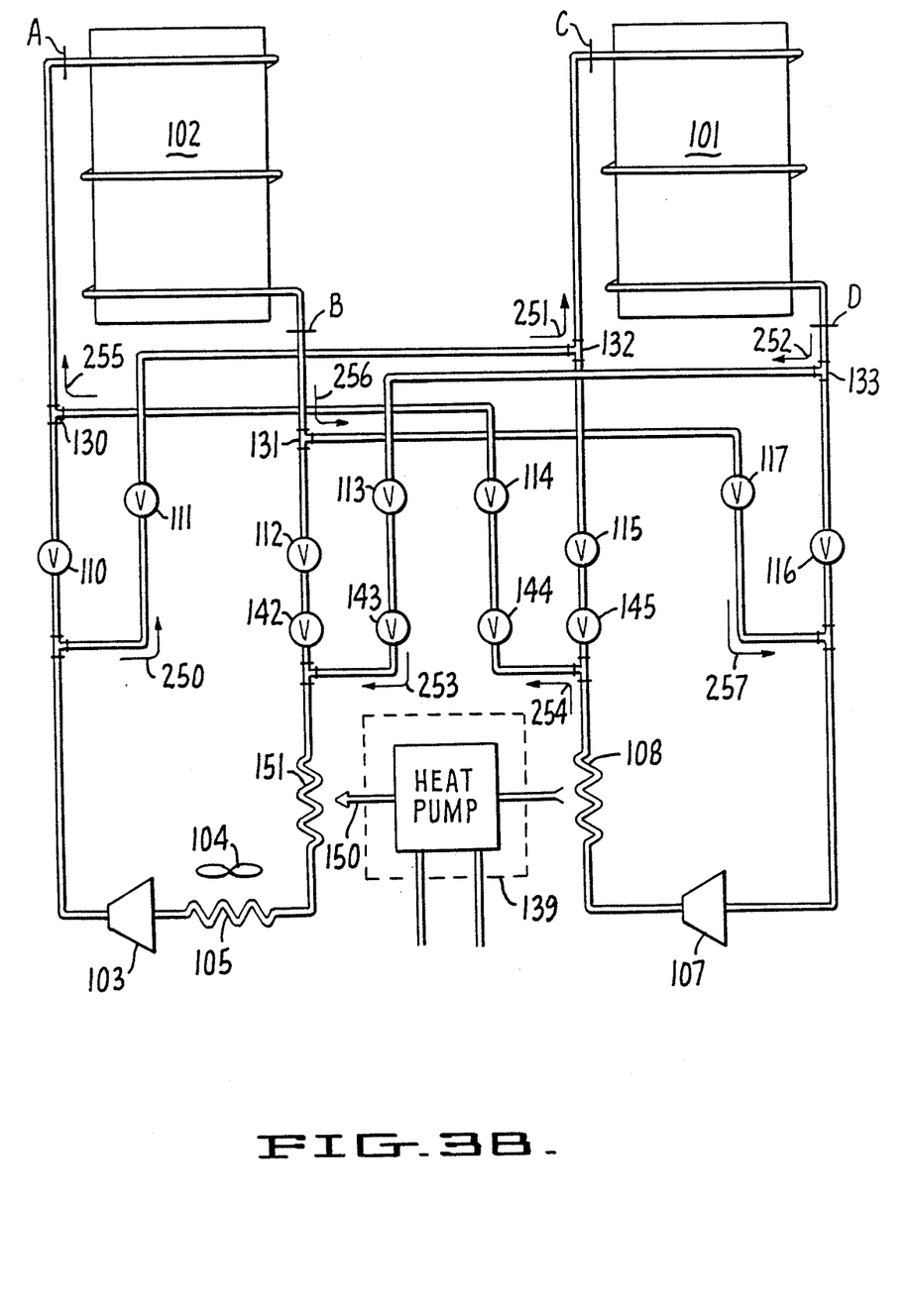

FIGS. 3A and 3B illustrate a preferred embodiment of the invention, that includes a single vapor compression coil system (rather than one independent refrigeration coil for each chamber) for chambers 101 and 102. The coil portion (or "end") coiled around the outside of each tank alternately serves as an evporator and as a condensor. Although these coil portions are shown coiled around the outside of the chamber, in a variation on the FIG. 3A/3B embodiment, they may be coiled within the interior of the chambers.

FIG. 3A and FIG. 3B represent the same system in two different operating modes. In FIG. 3A, solenoid valves 111, 113, 114, and 117 are switched off so that refrigerant flows only through solenoid valves 110, 112, 115, and 116. In FIG. 3B, solenoid valves 110, 112, 115, and 116 are switched off, so that refrigerant flows through solenoid valves 111, 113, 114, and 117 only.

In FIG. 3A, refrigerant (in a high-pressure vapor state) in the coil system flows from compressor 103, through valve 110 to chamber 102, in the direction of arrows 200 and 201. Thus, the portion of refrigerant between locations A and B acts as a condensor to extract heat from chamber 102 as the refrigerant in the coil condenses. The refrigerant then flows through expansion valve 142 to evaporator portion 151. Evaporator portion 151 is in thermal contact with heat pump 139. Heat flows from heat pump 139 to evaporator portion 151 in the direction of arrow 150, to evaporate the low-pressure liquid refrigerant in evaporator portion 151. Heat exchange unit 104 (which may be a fan) then serves to transfer excess heat from the refrigerant within coil portion 105. The low-pressure vapor refrigerant is then compressed in compressor 103.

The coil portion wrapped around chamber 101 (in FIG. 3A) between locations C and D acts as an evaporator to extract heat from within chamber 101. The refrigerant (in a low-pressure, vapor state) flows through valve 116 to compressor 107, from which it emerges as high-pressure vapor. The high-pressure vapor then flows through condensor portion 108, which is in thermal communication with heat pump 139. Heat pump 139 extracts heat from the refrigerant in portion 108, condensing the refrigerant and transferring the excess heat to evaporator portion 151 in the direction of arrow 150.

Freon (such as R11 or R12) may be used as the refrigerant in the vapor compression refrigeration coil. Suitable compressors, expansion valves, solenoid valves, and a suitable heat pump may be selected from commercially available models.

Conventional timers 166 and 169 (or electric signals from feedwater or wastewater fluid sensors such as those to be discussed below with reference to FIG. 4) supply signals via wires 167, 168, 170 and 171 to switch solenoid valves 111, 113, 114, and 117 on at a desired moment (such as when it is calculated that ice substantially thicker than on the order of one millimeter, i.e., ice of approximately one centimeter thickness, has formed on the walls of chamber 101) to commence a later production cycle stage (described below with reference to FIG. 3B), in which the roles of chambers 101 and 102 are reversed. In this later cycle stage, the coil portion wrapped around chamber 102 between locations A and C acts as an evaporator, and the coil portion wrapped around chamber 101 between locations C and D acts as a condensor. Also at a desired moment, timers 160 and 163 supply signals via wires 161, 162, 164, and 165 to switch solenoid valves 110, 112, 115, and 116 off.

The system, in the mode shown in FIG. 3B, has its solenoid valves switched so that high-pressure vapor refrigerant flows through valve 111 and T-connection 132 in the direction of arrows 250 and 251 to chamber 101. The refrigerant condenses in the coil portion between locations C and D to transfer heat to chamber 101 (to melt ice therein). The high-pressure liquid refrigerant emerging from condensor portion CD flows through T-connection 133, valve 113 (but not through valve 116) and expansion valve 143 (in the directions of arrows 252 and 253) to emerge as low pressure liquid at coil portion 151. Coil portion 151 is in thermal communication with heat pump 139, and functions as an evaporator, as in FIG. 3A. Accordingly, heat will flow from heat pump 139 to coil portion 151 to evaporate the refrigerant enclosed within coil portion 151. Excess heat is removed from the coil system by heat exchanger unit 104 at coil portion 105, as in FIG. 3A. Low-pressure vapor refrigerant emerging from coil portion 105 is compressed in compressor 103 and recirculates to chamber 101.

Low-pressure liquid refrigerant flows in the direction of arrow 255 to chamber 102. The coil portion wrapped around chamber 102 between locations A and B functions as an evaporator, so that evaporation of the refrigerant therewithin extracts heat from chamber 102 (to freeze a portion of chamber 102'scontents). Low-pressure vapor refrigerant emerging from this evaporator portion flows through T-connector 131 and solenoid valve 117 in the directions of arrows 256 and 257 to compressor 107. The high-pressure vapor emerging from compressor 107 flows through condensor coil 108, which as in FIG. 3A is in thermal communication with heat pump 139. Heat extracted from condensor 108 is transferred by heat pump 139 to evaporator coil 151. The high-pressure liquid emerging from condensor 108 flows through expansion valve 144, solenoid valve 114, and T-connector 130 in the directions of arrows 254 and 255.

Figure 4:
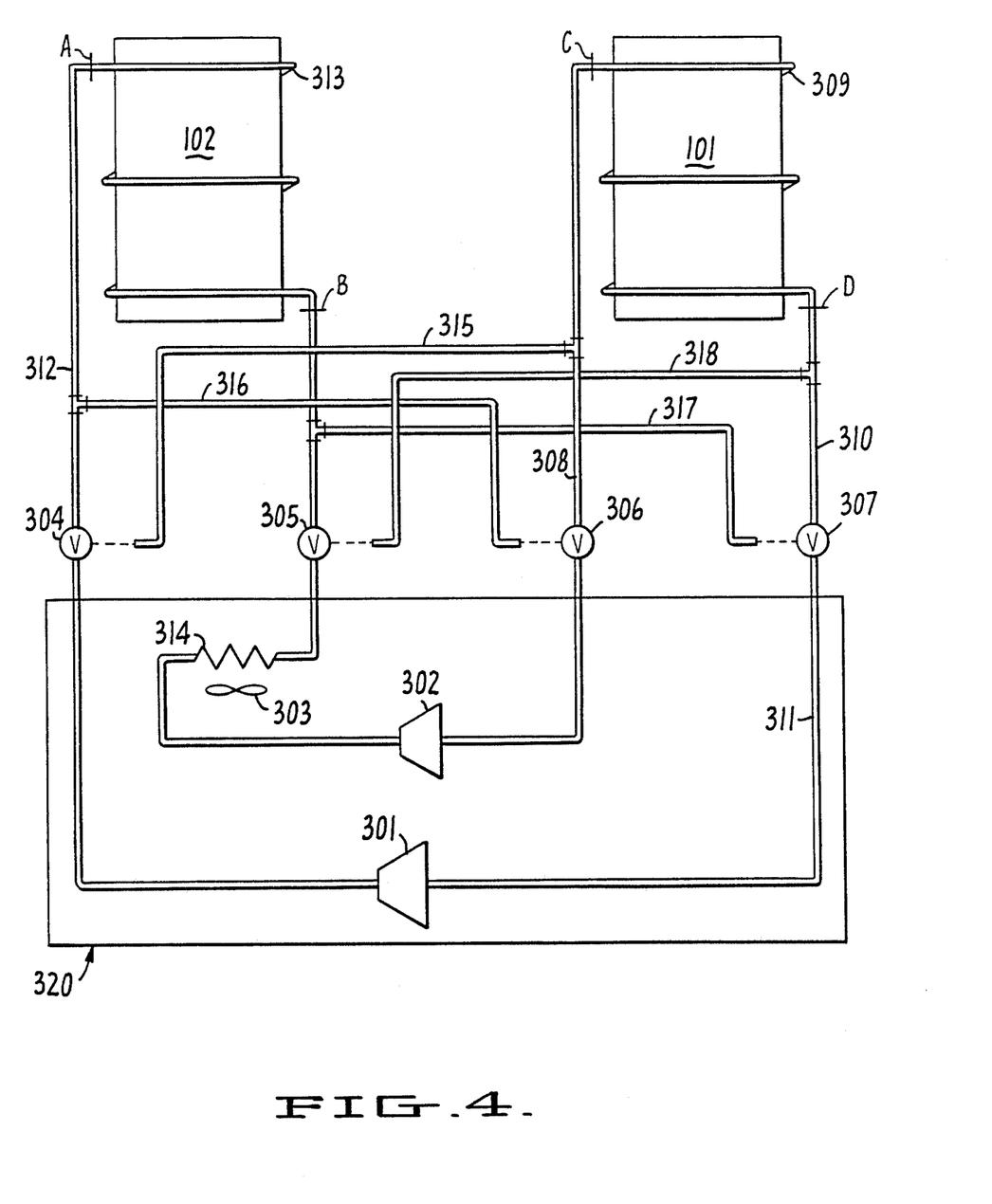
FIG. 4 is another preferrd embodiment of the inventive system, also including a single vapor compression refrigeration coil system.

The system of FIG. 4 is a variation on that of FIGS. 3A and 3B. In FIG. 4, the vapor compression refrigeration coil portions between locations A and B and between locations C and D alternately function as compressors and evaporators, as in the FIG. 3A/3B embodiment. Vapor compressor 301 compresses low pressure vapor refrigerant in coil portion 311. The high pressure vapor (having elevated temperature) emerging from compressor 301 flows through three-way valve 304 to passage 312 (but not through passage 315). The heated high pressure vapor gives off heat as it condenses in coil portion 313, thereby melting ice within chamber 102. The cooled liquid refrigerant then flows to the three-way valve 305, which directs the liquid to passage 314 but not to passage 318. Excessive heat is rejected to the atmosphere in heat exchanger 320 by fan 303, and the liquid then flows to expansion valve 302 where it undergoes adiabatic expansion. The low pressure liquid emerging from valve 302 flows through three-way valve 316 to passage 308 (but not to passage 316).

In coil portion 309, the liquid refrigerant extracts heat from chamber 101 as it evaporates, and liquid water in chamber 101 consequently freezes. The low pressure vapor refrigerant emerging from coil portion 309 flows through three way valve 307 to passage 311 (but not through passage 317), where it is ready to be compressed again.

When the ice sheet in chamber 101 grows to desired thickness, valves 304, 305, 306 and 307 are switched to cause coil portion 313 to function as an evaporator and coil portion 309 to function as a condenser. This switching operation causes valve 304 to direct fluid from compressor 301 to passage 316 but not to passage 312; causes valve 305 to direct fluid from passage 318 to passage 314; causes valve 306 to direct fluid from valve 302 to passage 316 but not to passage 308; and causes valve 307 to direct fluid from passage 317 to passage 311 (but not to passage 310).

Optionally, each of three-way valves 304–307 may be replaced by a pair of two-way valves in a manner that will be apparent to those of ordinary skill in the art. It will be appreciated that there are numerous other possible variations on the designs shown in FIGS. 3A/3B and FIG. 4, some employing more fluid valves and some employing less fluid valves than in FIGS. 3A/3B and 4. For example, the set of four three-way valves 304–307 in FIG. 4 may be replaced by a single four-way valve in one such variation on the FIG. 4 design.

Figure 5:
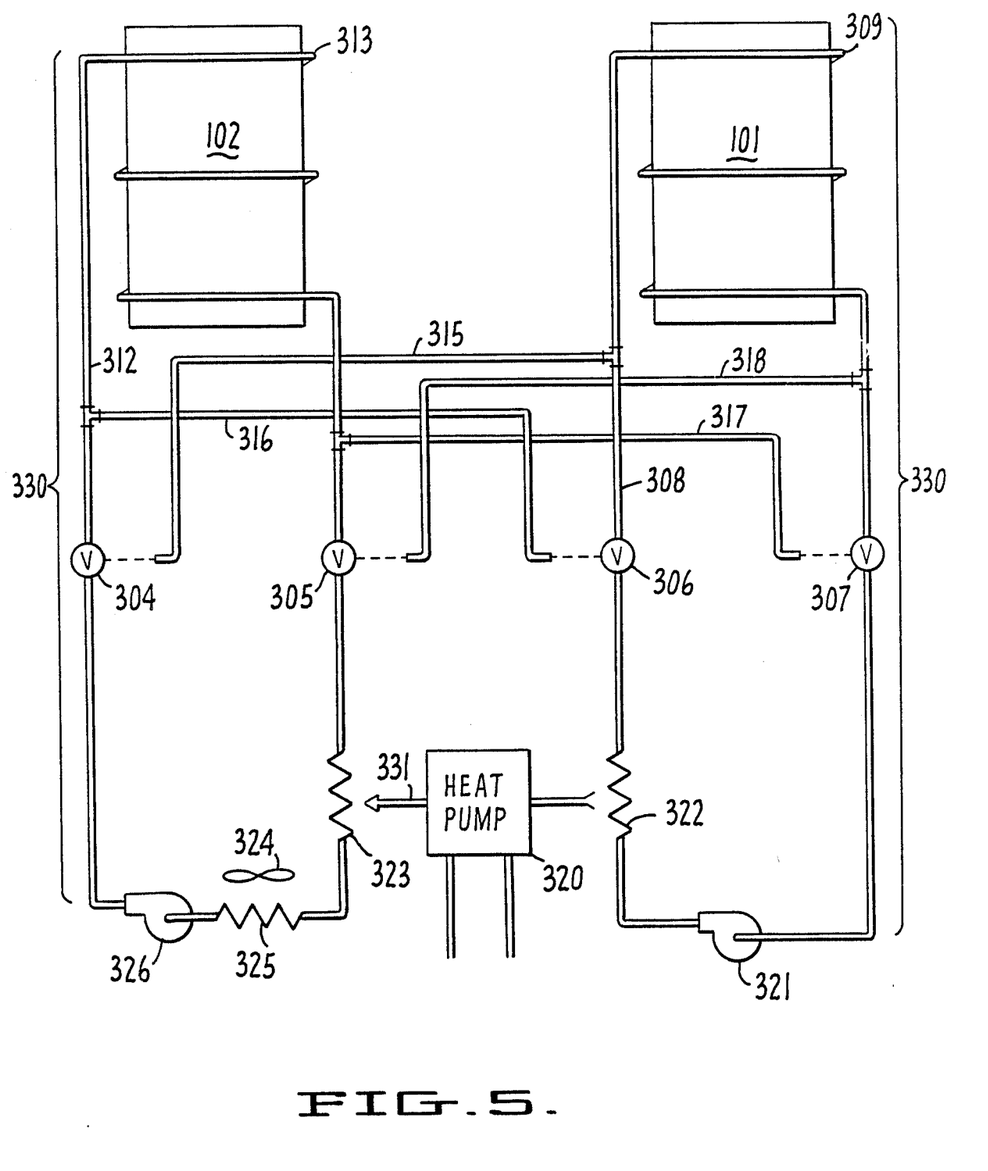
FIG. 5 is a third preferred embodiment of the inventive system, including a heat pump and a heat transfer fluid coil system for assisting the heat pump in pumping heat.

Yet another preferred embodiment of the invention will next be described with reference to FIG. 5. In FIG. 5, heat pump 320 pumps heat from right to left in the direction of arrow 331 (so that the cold surface of pump 320 is on the right and the hot surface of pump 320 is on the left). Heat pump 320 may be selected from those commercially available, for example those of the thermoelectric type. Heat transfer fluid coil system 330 is in thermal contact with pump 320 at coil positions 322 and 323. Coil system 330 contains heat transfer fluid, which need not be a refrigerant. Since typical heat pumps have a performance coefficient less than one (the performance coefficient is typically equal to about 0.5, so that to extract one unit of heat from portion 322, two units of heat must be transferred to portion 323), fan 324 is provided to reject excess heat to the atmosphere from coil portion 325. Pumps 321 and 326 circulate fluid within coil system 330.

To supply heat to chamber 102 (and to remove heat from chamber 101), valves 304, 305, 306 and 307 are switched to direct fluid from pump 326 to passage 312 (but not to passage 315), from portion 313 to passage 317, from 317 to pump 321, from pump 321 to portion 322, from portion 322 to passge 308, from passage 308 through portion 309 to passage 318, and from passage 318 to portion 323. To supply heat to chamber 101 (and remove heat from chamber 102), valves 304–307 are switched to direct fluid from pump 326 to passage 314, from portion 309 through passage 310 to pump 321, from pump 321 through portion 322 to passage 316, and from passage 316 through passage 312 and portion 313 to portion 323.

The flow of feedwater, unfrozen wastewater, and melted ice into and out from chambers 101 and 102 in the embodiments of FIGS. 3A/3B, 4 and 5 may be accomplished by a system of valves and flow lines identical to those described above with reference to the FIG. 1 and FIG. 2 embodiments. The walls of chambers 101 and 102 around which the heat transfer coils are wound are constructed of thermally conductivie material. During one stage of the production cycle, a layer of ice will form on the wall of one of the chambers while ice on the wall of the other chamber is melted. The optimum period of the freezing operation is determined by the following considerations.

When heat is removed from zero degree Fahrenheit liquid water in the freezing chamber a thin sheet of ice will form on the heat transfer surface (the chamber wall in the FIG. 3A/3B, FIG. 4, or FIG. 5 embodiment). As the ice layer thickens, the heat transfer rate will decrease, since ice is a thermal insulator. Therefore, at a constant temperature $T_s$ ($T_s<0$), at the ice forming surface, the time t required to obtain an ice sheet of thickness x is a nonlinear function of the thickness x. The thickness, x, of the ice sheet is determined by the following formula: $x^{2l} = (2K_i(T_s-T_f) t)/Q_1 d_i$, where $K_i$ is the thermal conductivity of ice (0.00535 cal/cm-sec-°C.), $T_f$ is the freezing temperature of water (0° C.), $Q_1$ is the latent heat of ice formation (80 calories per gram), and $d_i$ is the density of ice (0.92 g/cm$^3$). For example, at $T_s = -10°$ C., forming an ice sheet one cm. thick takes about 0.19 hours, but forming an ice sheet 50 cm. thick takes about 20 days.

Accordingly, it is preferable to minimize the freezing period while maximizing the ratio of heat transfer surface area to chamber volume, in order to maximize the system'sthroughput rate. However, if a high rate of impurity rejection is desire, a large surface area-to-chamber volume ratio is undesirable. This is because when impurity ladened liquid is drained from the chamber, some will cling to the ice remaining on the chamber wall due to the liquid'sviscosity. To minimize the amount of such liquid clinging, the ice surface area to volume ratio should be minimized.

I have found that the viscosity-retained liquid layer usually has thickness of less than about one millimeter, so that when the ice thickness is at least about an order of magnitude greater (i.e., about 0.5–1.0 cm.) the impurity concentration resulting from the vicosity-retained liquid is negligible. With the above-described constraints, the chamber dimensions and the time period of the freezing operation may optmized given the temperature attainable with the heat transfer components employed and the desired system throughput rate. Control of the system valves is readily accomplished using a timer, once the freezing operation period is determined. The required timer accuracy is very low, since the process effectiveness is not critically affected by variations in ice thickness on the order of a few millimetrs.

For example, I have found that for a system throughput rate of 6 gallons of purified water per day, with chamber wall temperature maintained at $-5°$ C. during the freezing operation, the period of the freezing operation is preferably 0.38 hours to produce ice of thickness one centimeter, and the chambers are preferably rectangular, with height and width equal to 9.5 cm., and thickness equal to 3 cm. If the heat transfer coil system is capable of maintaining only the higher temperature of $-1°$ C., the chamber should have dimensions of about 30 cm. by 30 cm. by 3 cm. If the heat transfer coil system (which may be a vapor compression refrigeration coil system) can maintain heat transfer surface temperature of $-10°$ C., then the chamber dimensions are preferably 6.78 cm. by 6.78 cm. by 3 cm.

An alternative embodiment of the invention will next be described with reference to FIG. 6. In the FIG. 4 embodiment, condensor coil 209 and evaportor coil 210 are disposed within chamber 220, rather than outside the chamber as in the FIG. 3A/3B embodiment. To fill chamber 220 to a desired level with feedwater, solenoid valve 223 is opened to permit feedwater to enter through inlet line 224. To drain liquid from the chamber through outlet line 226, solenoid valve 225 is opened. The wall of chamber 220 is preferably thermally insulating in this embodiment. When evaporator 210 is operated, it will extract heat from the upper surface of the feedwater contained in the chamber. Wire mesh plate 219 rests on floats 221, which may translate vertically, but are constrained from horizontal translation by guide loops 212 mounted in the chamber wall and electrically conductive guide rods 211. As the feedwater freezes, the ice layer growing downward from the upper surface will force floats 221 downward until electrically conductive end 216 of guide rod 211 contacts electrical lead 218. Electrical lead 218 will then conduct current to ground 214 via rod 211 and wire 213, in order to deactivate evaporator 210 and switch valve 225 into a "open" configuration to drain liquid from the chamber.

It should be appreciated that instead of floats 221 and guide rods 211, a simple, conventional timer may be provided to operate an appropriate switch (for example, to allow current to flow to ground 214) after a predetermined time has elapsed from the moment the evaporator 210 commences operation. Similarly, after a predetermined delay, or in response to a signal from another fluid sensor (not shown), condensor 209 is activated to melt the ice remaining in chamber 220, and to commence the freezing operation in the other chamber (not shown). After another predetermined delay, or in response to another signal from a fluid sensor (not shown), feed solenoid valve 223 will open and drain valve 225 will close. As feedwater enters chamber 220 via line 224, floats 221 will rise until end 216 contacts electrical lead 217. At this point, another electrical signal will flow to ground 214 to close valve 223, and to activate evaporator 210 in order to commence the freezing cycle in chamber 220 again.

Figure 6:
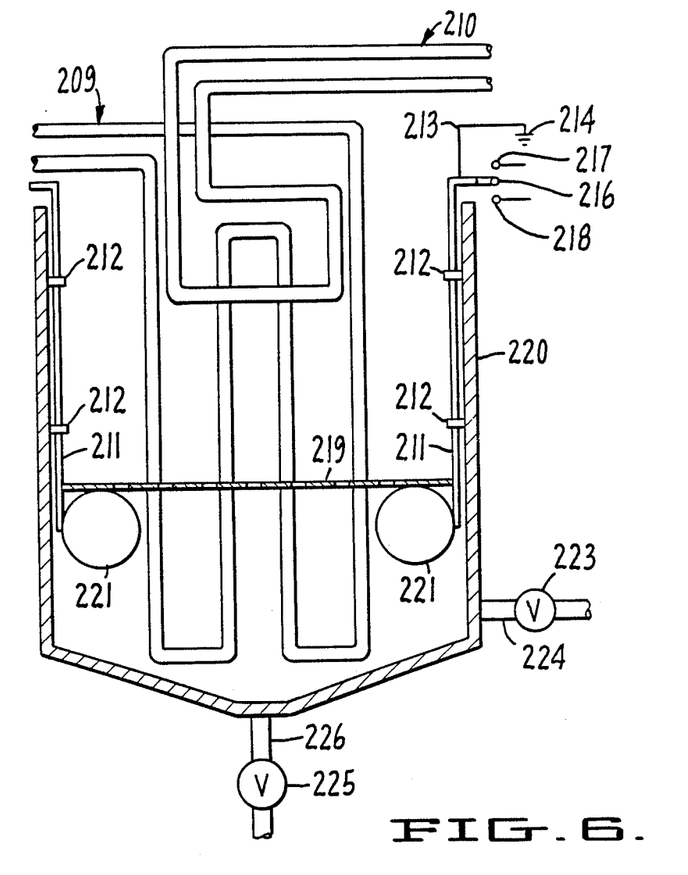
FIG. 6 is a cross-sectional view of one chamber of another preferred embodiment of the inventive system.

The refrigerator coil configuration of FIG. 6 (and the coil configuration of FIG. 7 into be discussed below) has the advantage of rejecting a high percentage (up to about 95%) of the feedwater impurities. The probable explanation for this advantage is that the chamber/evaporator coil geometry is such that heat is withdrawn from the upper surface of the liquid feedwater volume. Thus, the net result of gravity pulling down the (denser) more impure solution, and surface effects pulling up impurities to the upper heat transfer surface will be an unstable Rayleigh-Taylor layering in the cooling liquid feedwater. This in turn will result in convection mixing of the liquid feedwater so that few impurities will be trapped within the ice needles as they form, and instead, most impurities will remain in the unfrozen portion of the feedwater so that they may be drained away.

It should be recognized that condensor 209 and evaporator 210 may be portions of separate vapor compression refrigerator coils (as in FIG. 1) or may be portions of a common coil system (of the type described with reference to FIGS. 3A, 3B, and 4).

Figure 7:
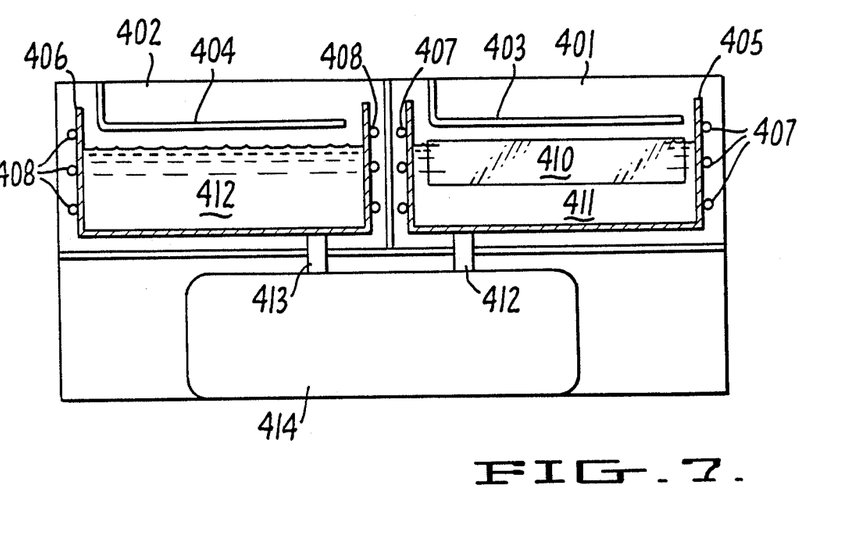
FIG. 7 is a simplified corss-sectional view of another preferred embodiment of the inventive system.

FIG. 7 shows another preferred configuration for the freezing and melting coil portions of the inventive system. The FIG. 7 system includes identical chambers 401 and 402. Flat, horizontal freezing surface 403 is disposed within chamber 401 and flat, horizontal freezing surface 404 is disposed within chamber 402. Melting coils 407 and 408 are wrapped respectively around wall 405 of chamber 401 and wall 406 of chamber 402. Drain passages 412 and 413 may be selectively opened and closed (by valves not shown in FIG. 7) to release liquid from within the associated chamber(s) to reservoir 414. The system is shown at a moment when drain passages 412 and 413 are both closed, and chamber 402 has just been filled with a volume of impure water 412 to be frozen, and chamber 401 contains a volume of impure water 411 with a sheet of ice 410 floating on the surface thereof.

Each of freezing surfaces 403 and 404 includes a freezing coil portion. Heat transfer fluid (which may be a refrigerant) may be caused to flow in each freezing coil portion to remove heat from the upper surface of a volume of water in each chamber. For example, freezing surface 403 extracts heat from the upper surface of water 411, thus forming flat horizontal ice sheet 410. With time, ice sheet 410 will grow in thickness downward, and will also spread horizontally toward wall 405, until freezing surface 403 is deactivated and heat transfer fluid is caused to flow within melting coil 407 so as to transfer heat to the contents of chamber 401.

It should be apreciated that more than one pair of chambers may be included in the inventive system, each associated with a pair of vapor compression refrigeration coils, or portions of a single common heat transfer coil system of one of the types described above. In operation, when one chamber of each pair of chambers is undergoing the freezing operation, the other chamber is simultaneously undergoing the melting operation.

The foregoing description is merely illustrative and explanatory of the inventive method and system. Various changes in the details of the system design and method of system operation described above may be within the scope of the appended claims.

I claim:

1. A water purification system comprising:
   a first chamber and
   a second chamber, each having a generally vertically-oriented thermally-conductive wall;
   heat transfer means having a first portion thermally coupled to the first chamber and a second portion thermally coupled to the second chamber, said first portion of said heat transfer means being thermally coupled to said wall for extracting heat through said wall from water within the first chamber to form a layer of ice adjacent said wall that grows in thickness inwardly from said wall; and means for operating the heat transfer means in a mode to extract sufficient heat from the first chamber via the first portion to form a layer of ice adjacent said wall in the first chamber, and simultaneously to supply sufficient heat to the second chamber via the second portion to melt ice within the second chamber.

2. The system of claim 1, wherein each chamber includes a wall of thermally condutive material, and each said portion is wrapped around said wall of the respective chamber.

3. The system of claim 2, wherein said wall in each chamber is generally vertically oriented between upper and lower limits, so that water from melting ice within the chamber may drain down the wall to the lower limit thereof, and comprising liquid draining means disposed near the lower limit of the wall in each chamber for draining water therefrom.

4. A water purification system comprising:
a first chamber and a second chamber for containing volumes of water therein;
heat transfer means having a first portion disposed in the first chamber above the upper surface of a volume of water therein and having a second portion disposed to thermally couple to a volume of water in the second chamber, the first portion of the heat transfer means operating to extract heat from the upper surface of a volume of impure water in the first chamber to form a horizontal ice layer that grows in thickness downwardly from the upper surface of the volume of water; and
the second portion of the heat transfer means operating substantially simultaneously to supply sufficient heat to melt ice within the second chamber.

5. The system of claim 4, wherein said first and second portions are positioned in each chamber above a volume of impure water therein.

6. A method of purifying impure water comprising the steps of:
confining a volume of impure water within boundaries;
extracting heat from the confined volume of water substantially only from upper regions thereof to form a layer of ice adjacent an upper boundary of the volume of impure water;
removing the unfrozen portion of the confined volume of impure water leaving the layer of ice;
supplying heat to melt the ice; and
draining the purified water associated with melting of the layer of ice.

7. The method according to claim 6 wherein in the step of extracting heat, heat is extracted substantially only from the upper surface of the confined volume of impure water to facilitate gravity separation of impurities within the confined volume of impure water as the layer of ice is formed adjacent the upper surface thereof.

8. The method according to claim 6 wherein in the step of removing, the unfrozen portion of the confined volume of impure water is removed from beneath the layer of ice that is adjacent the upper boundary of the confined volume.

9. The method according to claim 6 wherein the step of extracting heat continues for a period sufficient to form said layer of ice adjacent the upper boundary of the confined volume with a thickness of at least 1 mm.

10. The method according to claim 9 wherein the step of extracting heat continues for a period sufficient to form said layer of ice with a thickness of about 1 cm.

11. The method according to claim 10 wherein in the step of confining, the volume of impure water is confined within substantially vertical side boundaries; and
in the step of extracting, heat is extracted substantially only near the side boundaries to form said layer of ice adjacent the side boundaries.

12. The method according to claim 11 wherein the step of extracting heat continues for a period sufficient to form said layer of ice adjacent the side boundaries with a thickness of at leats 1 mm.

13. The method according to claim 12 wherein the step of extracting heat continues for a period sufficient to form said layer of ice with a thickness of about 1 cm.

14. The method according to claim 6 comprising the additional steps of:
confining an auxiliary volume of impure water within auxiliary boundaries;
extracting heat from the confined auxiliary volume of impure water substantially only from upper regions thereof to form a layer of ice adjacent an upper boundary of the auxiliary volume of impure water;
removing the unfrozen portion of the confined auxiliary volume of impure water leaving a layer of ice adjacent the upper boundary of the confined auxiliary volume of impure water;
supplying heat to melt the ice within the auxiliary boundaries;
draining the purified water associated with melting of the ice within the auxiliary boundaries; and
the steps of extracting heat from the confined volume and supplying heat to melt the ice within the auxiliary volume, and the steps of extracting heat from the confined auxiliary volume and supplying heat to melt the ice within the confined volume are performed substantially simultaneously and in alternate succession.

15. The method according to claim 14 wherein in the steps of extracting heat, heat is extracted substantially only from the upper surfaces of the confined volume and the confined auxiliary volume to facilitate gravity separation of impurities within said volumes of water as ice is formed adjacent the upper surfaces thereof.

16. The method according to claim 14 wherein in the steps of removing, the unfrozen portions of the confined volume and of the confined auxiliary volume of impure water are removed from beneath the layers of ice adjacent the upper boundary of the confined volume and adjacent the upper boundary of the confined auxiliary volume.

17. The method according to claim 14 wherein the steps of extracting heat continue for periods sufficient to form said layers of ice adjacent said upper boundaries with thicknesses of at least 1 mm.

18. The method according to claim 17 wherein the steps of extracting heat continue for period sufficient to form said layers of ice with thicknesses of about 1 cm.

19. The method according to claim 14 wherein in the steps of confining, the volumes of impure water are confined within side substantially vertical boundaries, and in the steps of extracting, heat is extracted substantially only from the side boundaries to form said layers of ice adjacent said boundaries.

20. The method according to claim 19 wherein the steps of extracting heat continue for periods sufficient to form said layers of ice adjacent said side boundaries with thicknesses of at least 1 mm.

21. The method according to claim 20 wherein the steps of extracting heat continue for periods sufficient to form said layers of ice with thicknesses of about 1 cm.

22. Apparatus for purifying impure water comprising:
a chamber for confining a volume of impure water;
heat transfer means disposed to extract heat from water within the chamber substantially only from upper regions thereof to form a layer of ice in a volume of impure water adjacent the upper regions of the chamber;
heater means disposed to melt ice in the chamber; and
liquid control means for selectively supplying impure water to the chamber, and for selectively removing unfrozen impure water from the chamber, and for selectively removing purified water from the chamber associated with melting ice therein.

23. Apparatus according to claim 22 wherein said heat transfer means is disposed to extract heat substantially only from the upper surface of a volume of impure water in the chamber to form a substantially horizontal layer of ice that increases in thickness downwardly to facilitate gravity separation of impurities within a volume of impure water as a layer of ice is formed adjacent the upper surface thereof.

24. Apparatus according to claim 23 wherein said liquid control means are coupled to a lower region of the chamber for draining an unfrozen portion of a volume of impure water and for draining water associated with melting ice from a lower region within the chamber beneath the region thereof in which a layer of ice is formed.

25. Apparatus according to claim 23 wherein said heat transfer means extracts heat for a period sufficient to form a layer of ice adjacent said upper surface with a thickness of at least 1 mm.

26. Apparatus according to claim 25 wherein said heat transfer means extracts heat for a period sufficient to form a layer of ice with a thickness of about 1 cm.

27. Apparatus according to claim 22 wherein said chamber for confining a volume of impure water includes side substantially vertical walls; and
said heat transfer means is disposed to extract heat substantially only near said side walls to form a layer of ice adjacent said walls.

28. Apparatus according to claim 27 wherein said heat transfer means extracts heat for a period sufficient to form a layer of ice adjacent said side walls with a thickness of at least 1 mm.

29. Apparatus according to claim 28 wherein said heat transfer means extracts heat for a period sufficient to form a layer of ice with a thickness of about 1 cm.

30. Apparatus according to claim 22 comprising:
an auxiliary chamber for confining an auxiliary volume of impure water;
auxiliary heat transfer means disposed to extract heat from water within the auxiliary chamber substantially only from upper regions thereof to form a layer of ice in a volume of impure water adjacent the upper regions of the auxiliary chamber;
auxiliary heater means disposed to melt ice in the auxiliary chamber; and
auxiliary liquid control means for selectively supplying impure water to the auxiliary chamber, and for selectively removing unfrozen impure water from the auxiliary chamber, and for selectively removing purified water from the auxiliary chamber associated with melting ice therein; and
said heat transfer means and said auxiliary heater means being disposed to operate substantially simultaneously to form a layer of ice in said chamber as ice within the auxiliary chamber is melted, and said auxiliary heat transfer means and said heater means being disposed to operate substantially simultaneously and in alternating succession relative to said heat transfer means and auxiliary heater means to form a layer of ice in said chamber as ice within said auxiliary chamber is melted.

31. Apparatus according to claim 30 wherein said heat transfer means and said auxiliary heat transfer means are disposed to extract heat substantially only from the upper surfaces of volumes of water confined within said chamber and said auxiliary chamber to facilitate gravity separation of impurities within said volumes of water as ice is formed adjacent the upper surfaces thereof.

32. Apparatus according to claim 31 wherein said liquid control means and auxiliary liquid control means are coupled to lower regions respectively of said chamber and said auxiliary chamber for draining the unfrozen portions of the confined volumes of impure water therein and for draining water associated with melting ice from lower regions of said chamber and said auxiliary chamber beneath the regions thereof in which layers of ice are formed.

33. Apparatus according to claim 31 wherein said heat transfer means and said auxiliary heat transfer means extract heat for periods sufficient to form layers of ice adjacent the upper surfaces of water within the chamber and auxiliary chamber with thicknesses of at least 1 mm.

34. Apparatus according to claim 33 wherein said heat transfer means and said auxiliary heat transfer means extract heat for periods sufficient to form said layers of ice with thicknesses of about 1 cm.

35. Apparatus according to claim 30 wherein said chamber and said auxiliary chamber include side substantially vertical walls; and
said heat transfer means and said auxiliary heat transfer means are disposed to extract heat substantialy only near said side walls to form said layers of ice adjacent said walls.

36. Apparatus according to claim 35 wherein said heat transfer means and said auxiliary heat transfer means extract heat for periods sufficient to form said layers of ice adjacent said side walls with thicknesses of at least 1 mm.

37. Apparatus according to claim 36 wherein said heat transfer means and said auxiliary heat transfer means extract heat for periods sufficient to form said layers of ice with thicknesses of about 1 cm.

* * * * *